(12) United States Patent
Katayama et al.

(10) Patent No.: US 7,558,403 B2
(45) Date of Patent: Jul. 7, 2009

(54) INFORMATION PROCESSING APPARATUS AND INFORMATION PROCESSING METHOD

(75) Inventors: Akihiro Katayama, Yokohama (JP); Kenji Morita, Yokohama (JP); Hiroki Yonezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 11/277,861

(22) Filed: Mar. 29, 2006

(65) Prior Publication Data
US 2006/0239525 A1    Oct. 26, 2006

(30) Foreign Application Priority Data
Apr. 1, 2005    (JP) ............... 2005-106793

(51) Int. Cl.
*G06K 9/00* (2006.01)
*G06F 3/00* (2006.01)
(52) U.S. Cl. ..................... 382/103; 715/700
(58) Field of Classification Search ........ 382/103, 382/154; 715/700
See application file for complete search history.

(56) References Cited

U.S. PATENT DOCUMENTS

| 2002/0075286 A1 | 6/2002 | Yonezawa et al. ........ 345/679 |
| 2003/0032484 A1* | 2/2003 | Ohshima et al. ........ 463/43 |
| 2004/0070611 A1 | 4/2004 | Tanaka et al. ........ 715/767 |

FOREIGN PATENT DOCUMENTS

| JP | 11-073207 | 3/1999 |
| JP | 2002-157607 | 5/2002 |
| JP | 2004-178554 | 6/2004 |
| JP | 2004-355131 | 12/2004 |

OTHER PUBLICATIONS

N. Kukimoto et al., "Implementation and Evaluation of a Visualization System with Facilities for Control for Control and Annotation within Visual Environment via PDA", in *Denshi jouhou tsuushin gakkai rombunshi*, D-II vol. J88, No. 3, pp. 595-604, 2005; partial translation.
"Virtual Object Manipulation on a Table-Top AR Environment", H. Kato et al. Proceedings of ISAR 2000, Oct. 5-6, 2000, pp. 111-119.
"A Software Platform for Mixed reality System", S. Uchiyama et al., Proceedings of 6th Annual Conf. of the Virtual Reality Society of Japan, 4 pgs. (English Abstract).

* cited by examiner

*Primary Examiner*—Tom Y Lu
(74) *Attorney, Agent, or Firm*—Fitzpatrick, Cella, Harper & Scinto

(57) ABSTRACT

A configuration for measuring the position and the orientation specific to a mixed reality is separated from an application 70 to operate independently, and a shared memory 60 or process-to-process communication is used for data communication between them. This allows to modify configuration associated with the measurement of the position and the orientation such as the type of the sensor or an alignment method without modifying or recompiling the application 70. This facilitates providing the mixed reality system and supporting system modification.

8 Claims, 20 Drawing Sheets

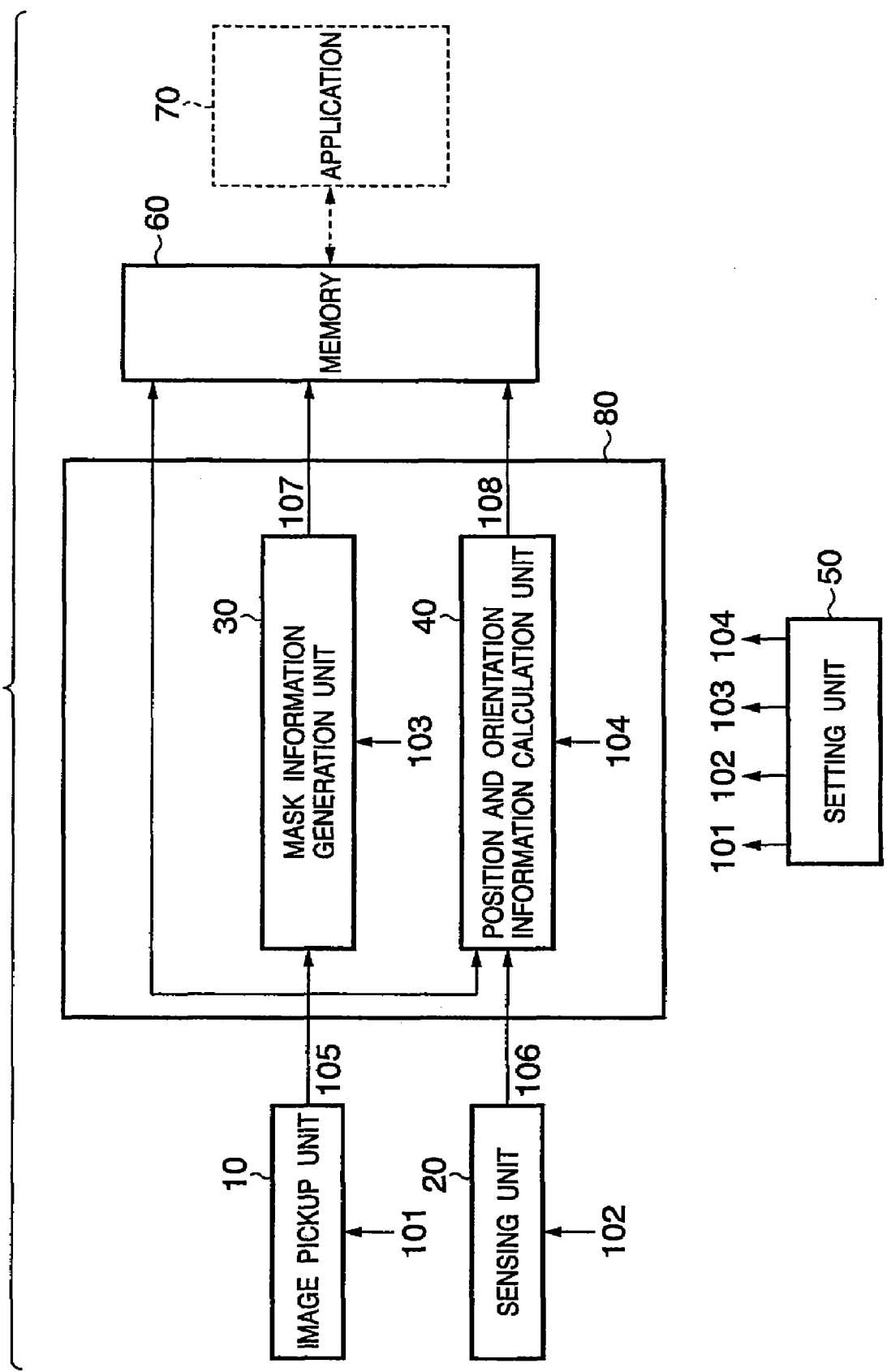

| | | MASTER | | SLAVE | |
|---|---|---|---|---|---|
| CAMERA PARAMETER SETTING | | | | | |
| ─CAMERA PARAMETER─ | | | | | |
| LENS DISTORTION | CENTER (HORIZONTAL, LONGITUDINAL): | 317.9293 | 239.5 | 317.9293 | 239.5 |
| | KCubic: | 30.57961 | 0 | 30.57961 | 0 |
| | KQuintic: | | | | |
| | KVtoH: | 0.973311 | | 0.973311 | |
| | KScale: | 1 | | 1 | |
| PERSPECTIVE PROJECTION TRANSFORMATION | FOCAL LENGTH (HORIZONTAL, LONGITUDINAL): | 736.4838 | 736.4838 | 736.4838 | 736.4838 |
| | PRINCIPAL POINT (HORIZONTAL, LONGITUDINAL): | 317.9293 | 239.5 | 341.516 | 239.5 |

POSITION AND ORIENTATION OF SLAVE CAMERA FROM MASTER CAMERA'S VIEWPOINT

POSITION: 63 | 0 | 0
ORIENTATION: 0 | 1 | 0 | 0

CAMERA PARAMETER MEASUREMENT RESULT

MEASUREMENT (C) | READ (T)... | SAVE (E)... | ORGANIZE (O)...
APPLY DEFAULT OF VH-2002 (D)

OK | CANCEL | APPLY (A)

410

- MRP Configuration - DefaultProfile
- ● STARTUP AND TERMINATION OF ENGINE
- ● PROFILE
- ● CAMERA
  - CAPTURE DEVICE
  - CAMERA PARAMETER
  - CAMERA ALIGNMENT
    - 6DOF SENSOR
    - ERROR CORRECTION BY MARKER
- ● TARGET
- ● MARKER RECOGNITION
- ● SENSOR SYSTEM
  - FASTRAK

F I G. 11

MRP Configuration - DefaultProfile

- STARTUP AND TERMINATION OF ENGINE
- PROFILE
- CAMERA
  - CAPTURE DEVICE
  - CAMERA PARAMETER
  - CAMERA ALIGNMENT
    - 6DOF SENSOR
    - ERROR CORRECTION BY MARKER
- TARGET
  - TARGET 1 (11)
- MARKER RECOGNITION
- SENSOR SYSTEM
  - FASTRAK

FASTRAK SETTING

COM PORT (O): COM1 ▼   DATA LENGTH (L): 8 ▼

PORT RATE (B): 115200 ▼   PARITY BIT (P): NONE ▼

SYNCHRONOUS MODE (S): INTERNAL SYNCHRONIZATION ▼

☑ OMIT FASTRAK INITIALIZATION (H)

☑ RECOGNIZE BUTTON STATUS OF STYLUS (B)

— MEASUREMENT HEMISPHERE SETTING —

| | X ELEMENT | Y ELEMENT | Z ELEMENT |
|---|---|---|---|
| STATION 1 (CAMERA) (1): | 0 | 0 | -1 |
| STATION 2 (TARGET 1) (2): | 0 | 0 | -1 |
| STATION 3: | 0 | 0 | -1 |
| STATION 4: | 0 | 0 | -1 |

☐ USE SAME MEASUREMENT HEMISPHERE SETTING FOR ALL STATIONS (U)

420

[ OK ]   [ CANCEL ]   [ APPLY (A) ]

FIG. 13

☐ MRP Configuration - DefaultProfile  ☐ ☐ ☒

● STARTUP AND TERMINATION OF ENGINE
● PROFILE
● CAMERA
  ├─ CAPTURE DEVICE
  ├─ CAMERA PARAMETER
  └─ CAMERA ALIGNMENT
     └─ 6DOF SENSOR
        └─ ERROR CORRECTION BY MARKER
● TARGET
  └─ TARGET 1 (11)
● MARKER RECOGNITION
● SENSOR SYSTEM
  └─ FASTRAK

ERROR CORRECTION SETTING BY MARKER
─ SENSOR ERROR CORRECTION SETTING ──────────────

MARKER IDENTIFICATION ALLOWABLE ERROR
(RATIO WITH RESPECT TO ENTIRE IMAGE) (E) : [0.300]
⇨ ─────────────────

THE NUMBER OF ACCUMULATED
MARKER CORRECTION INFORMATION (S) : [10]
⇨ ─────────────────

┌─ SENSOR ERROR CORRECTION METHOD IN CAMERA ─┐
│  POSITION AND ORIENTATION ESTIMATION        │
│                                              │
│  ⊙ CORRECTION BY ROTATION (O)               │
│                                              │
│  ○ ROTATION CORRECTION IF THE NUMBER OF MARKERS FOR OPTIMUM │
│    SOLUTION CORRECTION BY JCP ALGORITHM IS ONE OR TWO      │
└──────────────────────────────────────────────┘

REUSE OF POSITION AND ORIENTATION CORRECTION RESULT :

☐ REUSE IN MARKER            ☑ REUSE IN POSITION AND
  RECOGNITION (M)              ORIENTATION CORRECTION (C)

[ RESTORE INITIAL STATE (R) ]

[  OK  ]   [ CANCEL ]         [  APPLY (A)  ]

INFORMATION PROCESSING APPARATUS AND INFORMATION PROCESSING METHOD

FIELD OF THE INVENTION

The present invention relates to an information processing apparatus and information processing method and particularly relates to an information processing apparatus and information processing method for acquiring and generating information such as a position and orientation and an image required to provide mixed reality.

BACKGROUND OF THE INVENTION

Conventionally, as software for realizing a system providing Mixed Reality (MR) (mixed reality system), AR toolkit, MR platform or the like has been proposed. For details about AR toolkit, please refer to H. Kato, M. Billinghurst, I. Poupyrev, K. Imamoto, K. Tachibana. Virtual Object Manipulation on a Table-Top AR Environment. In Proceedings of ISAR 2000, Oct. 5-6, 2000. For details about MR platform, please refer to Uchiyama, Takemoto, Yamamoto, Tamura: "MR System Koutiku Kiban 'MR Platform' No Kaihatsu (Development of MR System Construction Platform 'MR Platform')", Nihon Virtual Reality Gakkai Dai 6 Kai Taikai Ronbunshu (Proceedings of 6th Annual Conference of the Virtual Reality Society of Japan), pp. 457-460, September 2001.

These provide as software library programs for acquiring the position and the orientation information or the like of an observer or an object required to construct the mixed reality system. Therefore, developers of the mixed reality system first incorporate the software as a library into a system having a required hardware configuration. Next, by developing an application using the library, the desired mixed reality application can be easily constructed.

However, to use the software library disclosed in the above references, it has been needed to compile it with an application incorporating it. Therefore, if the type of an alignment function included in the provided library, a sensor or the like is modified, it has been needed to rewrite and recompile the source code of the application program in order to use the modified function.

To operate the mixed reality system, processes are needed such as determining the combination of the type of the position and orientation sensor and a registration scheme, calibrating a camera and the sensor in advance, editing a data to be used. Since the combination of the sensor and the registration scheme has been conventionally managed by users, the users have been required to understand the combination which operates correctly and it was a laborious task. Furthermore, while the calibrations of the camera, sensor and the like have been independently performed by their dedicated tools, the order of using tools was fixed or each calibration data created by the respective tools had interdependency. For this reason, with understanding each tool, data relations and the situation, users have been required to perform the calibrations.

SUMMARY OF THE INVENTION

In view of these problems in the prior art, it is an object of the present invention to provide an information processing apparatus and information processing method for providing a mixed reality system and facilitating to accommodate system modification.

According to an aspect of the present invention, there is provided an information processing method comprising: an image information acquisition step of acquiring an image from an image pickup unit for picking up physical space; a sensor information acquisition step of acquiring a sensor output for measuring at least one of the position and the orientation of a subject in the physical space; a calculation step of calculating at least one of the position or the orientation of the subject using at least one of the image of the physical space and the sensor output; an output step of supplying the image of the physical space and the at least one of the calculated position and the orientation of the subject to an external application for generating a virtual object image to be registered with the physical space image to display a superimposed image using the at least one of the position and the orientation; and a presentation step of presenting a user interface causing a user to set parameters used in the calculation step, wherein the presentation step determines parameter options the user can set, based on a previously stored parameter information for dependency on other parameters and a possible combination with other parameters, and presents a user interface according to the determination.

According to another aspect of the present invention, there is provided an information processing apparatus comprising: an image information acquisition unit adapted to acquire an image from an image pickup unit for picking up physical space; a sensor information acquisition unit adapted to acquire a sensor output for measuring at least one of the position and the orientation of a subject in the physical space; a calculation unit adapted to calculate at least one of the position and the orientation of the subject using at least one of the image of the physical space and the sensor output; an output unit adapted to supply the image of the physical space and the at least one of the calculated position and the orientation of the subject to an external application for generating a virtual object image to be registered with the physical space image to display a superimposed image using the at least one of the position and the orientation; and a presentation unit adapted to present a user interface causing a user to set parameters used in the calculation unit, wherein the presentation unit determines parameter options the user can set, based on a previously stored parameter information for dependency on other parameters and a possible combination with other parameters, and presents a user interface according to the determination.

According to the present invention, this configuration allows to provide a mixed reality system and facilitate to accommodate system modification.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing an exemplary configuration of the mixed reality information generation device according to an embodiment of the present invention;

FIG. 8 shows an example of a setting screen for camera parameters;

FIG. 11 shows an example of the setting screen displayed when a magnetic sensor is selected in FIG. 10;

FIG. 13 shows an example of a setting screen for an error correction method by a marker;

FIG. 14 shows a screen for setting a subject except for the HMD (embedded camera) for which the position and the orientation always needs to be kept track of;

DETAILED DESCRIPTION OF THE PREFERRED EMBODIMENTS

Figure 2A:
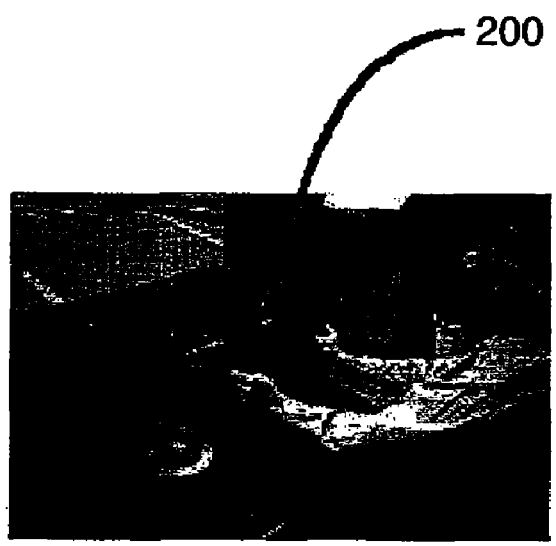
FIGS. 2A and 2B show an example of a mixed reality system provided by a mixed reality information generation device and an application 70 according to the present embodiment.

The embodiments described below separate a position and orientation measurement portion specific to a mixed reality (MR) system and an application using the measured position and orientation and configure both as execute form modules. Data transfer between the modules is characterized by using a shared memory or process-to-process communication. This configuration eliminates the need for modifying the application program when the position and orientation measurement portion is modified and can eliminate modification of a source code and recompile required in the prior art. The term "MR" as used herein is intended to include Augmented Reality (AR).

First Embodiment

The mixed reality information generation device, as an example of an information processing apparatus according to a first embodiment of the present invention, will be described below with reference to the drawings. The term "mixed reality information" means measurement information required to provide the mixed reality system and includes at least information about the position and/or orientation of a subject and further includes a real image and mask information as required.

FIG. 1 is a block diagram showing an exemplary configuration of the mixed reality information generation device according to the present invention.

In the figure, an image pickup unit 10 is constituted by an analog camera, a digital camera or the like comprising an interface such as IEEE1394 or USB, and outputs picked-up image information 105. The image pickup unit 10 is composed of two cameras such as a HMD attached to a device mounted on user's head, and picks up physical space images for right and left eyes. Although not explicitly shown in the drawings and the following description, it is intended that the process occurs in two channels for left and right eyes.

A sensing unit 20 is a magnetic sensor, gyro sensor, acceleration sensor, clinometer or the like for measuring one or both of the position and the orientation of at least one subject, and outputs measurement information 106.

A mask information generation unit 30 generates mask information for retrieving particular information from image information 105 input from the image pickup unit 10. A position and orientation information calculation unit 40 calculates one or both of the position and the orientation of the subject using one or both of the measurement information 106 from the sensing unit 20 and the image information 105 from the image pickup unit 10, and outputs them as position and orientation information 108.

A setting unit 50 performs setting for operation, initial information and the like of devices constituting the mixed reality information generation device (hereinafter also referred to as an MRP Configuration). A memory 60 retains image information 105 from the image pickup unit 10, mask information 107 from the mask information generation unit 30 and position and orientation information 108 from the position and orientation information calculation unit 40. An application 70 is an application program using mixed reality information output from the mixed reality information generation device. Although the application 70 is not included in the mixed reality information generation device, it is explicitly shown for the purpose of explanation.

In the following description, the mask information generation unit 30 and the position and orientation information calculation unit 40 are collectively referred to as a mixed reality information generation unit (or engine or MRP Engine) 80.

Image pickup unit 10 picks up an image according to setting information 101 (e.g., aperture, shutter speed, tint or the like) which are set by the setting unit 50 and outputs the picked-up image as the image information 105 to the mask information generation unit 30, position and orientation information calculation unit 40 and the memory 60. The sensing unit 20 operates according to setting information 102 (such as the type of sensor used by the sensing unit 20 and information required for the sensor to operate) which are set by the setting unit 50 and outputs the measurement result as the measurement information 106 to the position and orientation information calculation unit 40.

The mask information generation unit 30 receives the image information 105 from the image pickup unit 10 and operates according to setting information 103 which is set by the setting unit 50. As an example, a region which is estimated to be flesh color is extracted from the image and is output as mask information 107 (a bitmap in which the flesh color region is "1" and the others are "0"). If user's hands are included in the picked up range of the image pickup unit 10, such mask information will be a mask extracting regions of hands.

However, instead of this, the mask information may be generated using edge information or depth information obtained from parallax images picked up by the image pickup unit 10, and instead of user's hands included in the image information 105, the mask information may be generated by extracting any object.

According to setting information 104 which is set by the setting unit 50, the position and orientation information calculation unit 40 calculates the position and orientation information 108 of the subject from the image information 105 from the image pickup unit 10 and the measurement information 106 from the sensing unit 20, and records it in the memory 60. Accordingly, the image information 105 and the corresponding mask information 107 and position and orientation information 108 are stored in the memory 60. The application 70 accesses to the memory 60 as a shared memory. Next, the application 70 acquires the position and orientation information 108 required for generating a virtual environment (CG virtual object), the image information 105 for combining with the virtual environment and the mask information 107, and operates. The mask information 107 is information for preventing experient's hands from being hidden by virtual objects when combined.

Figure 20:
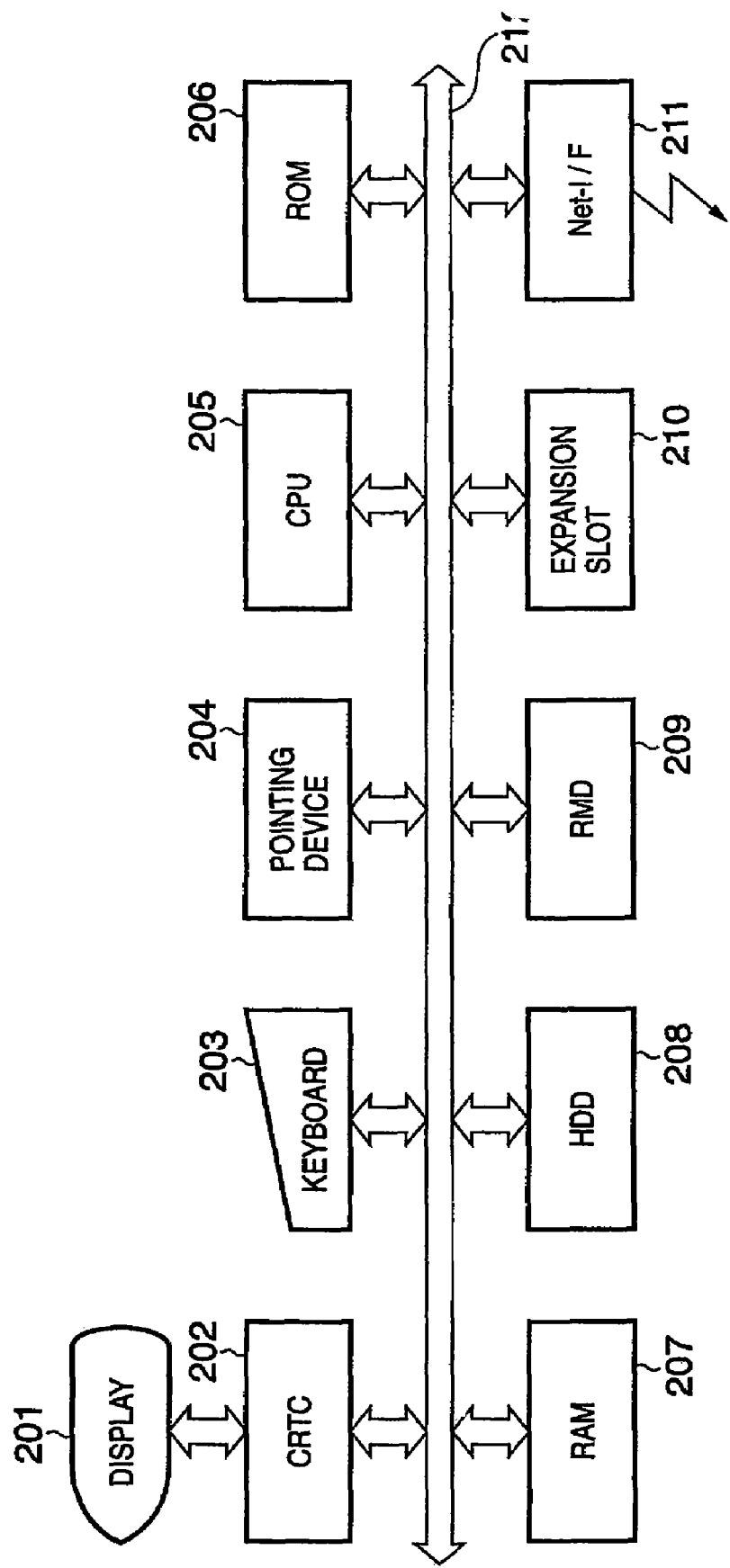
FIG. 20 is a block diagram showing an exemplary configuration of a general-purpose computer device that can be used as the mixed reality information generation device according to the present embodiment.

FIG. 20 is a block diagram showing an exemplary configuration of a general-purpose computer device that can be used as the mixed reality information generation device according to the present embodiment.

In the figure, a display 201 displays information of data being processed by the application program, each type of message menu and the like, and is constituted by a CRT (Cathode Ray Tube), LCD (Liquid Crystal Display) or the like. A CRTC 202 as a Video RAM (VRAM) display controller controls screen display to the display 201. A keyboard 203 and a pointing device 204 are used to input characters, point to an icon or a button or the like on GUI (Graphical User Interface). A CPU 205 is responsible for controlling entire computer device.

The ROM (Read Only Memory) 206 stores programs executed by the CPU 205, parameters and the like. A RAM (Random Access Memory) 207 is used as a work area during execution of the CPU 205, a save area during error processing or the like.

A hard disk drive (HDD) 208 and a removable media drive (RMD) 209 function as external storage devices. The removable media drive is a device for read/write or readout of a removable recording medium. The removable media drive may be a removable HDD as well as a flexible disk drive, optical disk drive, magneto-optical disk drive or memory card reader.

OS, an application program such as a browser, data, library or the like is stored in one or more of the ROM 206, the HDD 208 and (a recording medium of) the RMD 209 according to their use. These application programs include a program causing a general-purpose computer to function as the mixed reality information generation device according to the present embodiment or an error processing program as described below. The application 70 can also be executed on the computer device. In this case, the shared memory 60 can be provided as a portion of the RAM 207.

An expansion slot 210 is a slot for mounting an expansion card conforming to for example, PCI (Peripheral Component Interconnect) bus standard. Various expansion boards such as a video capture board for connecting the image pickup unit 10 to capture image information, a sound board, a graphic board for connecting a HMD and GPIB board can be mounted on the expansion slot 210.

A network interface 211 is an interface for connecting the computer device to a computer network. A bus 212 consists of an address bus, a data bus and a control bus, and connects between each unit described above. In addition to the network interface 211, the computer device has a serial interface such as RS-232C, RS-422, USB (Universal Serial Bus) and IEEE1394 and a parallel interface such as IEEE1284, so that the computer device can be connected to a sensor included in the sensing unit 20 as well as an external device such as a modem or a printer.

Such a general-purpose computer device is connected to a router (including dial-up router) over the network interface 211, or a modem, TA or the like via a serial interface as required. Using OS and driver software required to control these devices, it is possible to communicate with other devices on a computer network or a public telephone network.

The mixed reality information generation unit 80 in FIG. 1 may be provided in the form of software for example, with the CPU 205 executing a control program, or may be provided using a dedicated hardware. With the CPU 205 displaying a GUI on the display 201 in response to an operation of the keyboard 203 and the pointing device 204, and storing the content which is input and set via the GUI in a portion of the RAM 207, the setting unit 50 may provided. The CPU 205 controls each unit using the stored setting values.

Figure 2B:
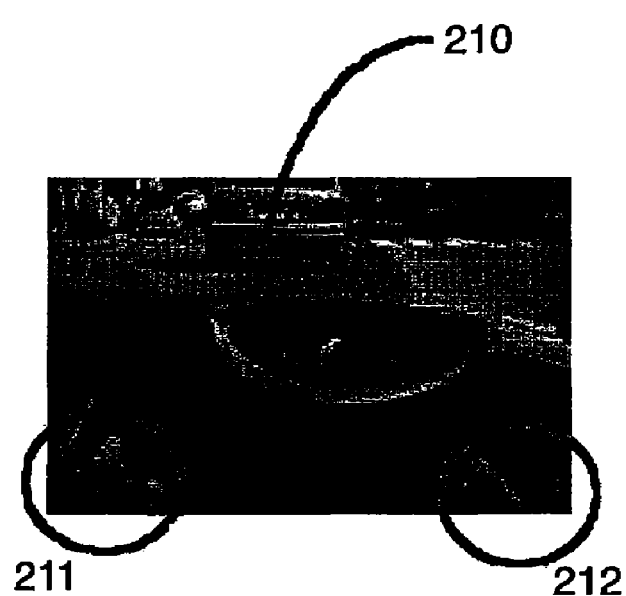

FIG. 2A and 2B show an example of a mixed reality system provided by a mixed reality information generation device and the application 70 according to the present embodiment.

This system employs a simple mock-up of an automobile (a mock-up that is made within a range that can be seen from driver's seat). A real image picked up by HMD embedded camera and an image of a instrument panel created with CG are combined and displayed on the HMD (including a magnetic sensor as a sensing unit 20 and the camera as an image pickup unit 10) attached to an observer. This process allows to evaluate a design inside the automobile as if riding on and touching a real automobile.

A subject in the system is the HMD attached to the observer, and more precisely the camera embedded in the HMD. By determining the position and the orientation of the camera, creating and combining an image of a virtual object using this information, the composite image in which the real image and the virtual object image are correctly aligned can be presented to the observer.

FIG. 2A shows a situation that the observer is experiencing the application described above. The observer is wearing the HMD (video see-through type HMD) in which the camera is embedded and the magnetic sensor is provided. A handle and a seat in the figure are real objects (mock-up). FIG. 2B shows an image (composite image) displayed on the HMD that the observer is wearing in the situation of FIG. 2A. Reference numeral 210 denotes a CG image of an instrument panel portion combined with the solid mock-up, and reference numerals 211 and 212 denote real images of the observer's hands. While the instrument panel portion of the automobile including the handle is all CG image, CG is not combined in the hands portions by employing the mask information and the experient's hands can be seen, thereby allowing further to increase the reality during experience.

In FIGS. 2A and 2B, the real image of the road which can be seen at the position corresponding to a windshield is provided by projecting a video image or the like previously recorded separately from the image pickup unit 10 on a screen placed behind.

Figure 3:
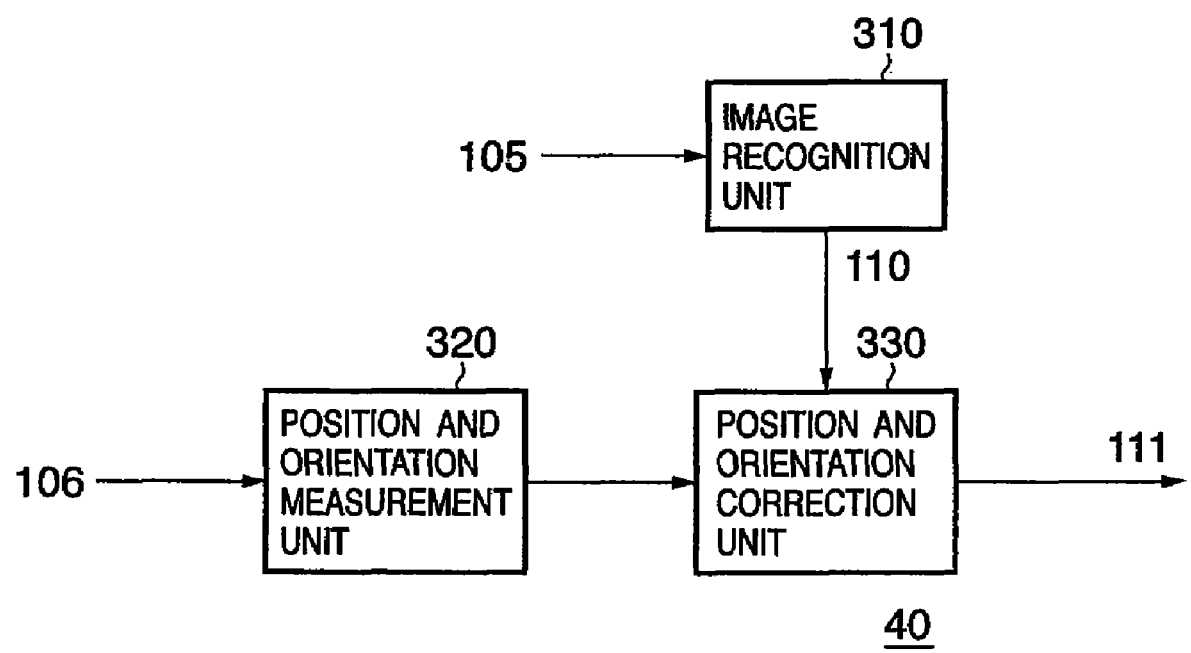
FIG. 3 is a block diagram showing an exemplary internal configuration of the position and orientation information calculation unit 40 in FIG. 1.

FIG. 3 is a block diagram showing an exemplary internal configuration of the position and orientation information calculation unit 40 in FIG. 1.

An image recognition unit 310 detects position marker (e.g., a region having a predetermined color or form) from the image information 105. A position and orientation measurement unit 320 transforms the measurement information 106 from the sensing unit 20 to a 4×4 matrix representing the position and the orientation in the standard coordinate system. The position and orientation correction unit 330 corrects the measurement information 106 according to marker information 110 output from the image recognition unit 310 and outputs it as the position and orientation information 108.

The operation is described when a magnetic sensor (e.g., 3SPCACE FASTRAK from Polhemus, Flock of Birds from Ascension Technology Corporation, etc.) is used as the sensing unit 20. Assume that the measured values from such a 6 degrees of freedom sensor are directly used directly as the position and the orientation of the subject (in this case, the camera embedded in the HMD) to draw and combine a virtual object. In this case, sensor error may cause the positions of the real image and a virtual object calculated based on the measured values to be substantially misaligned and the reality of the composite image may be compromised. For example, if a magnetic sensor is used as the sensor for measuring the position and orientation, the error is larger and the amount of misalignment is increased if metal exists near the measurement unit (HMD) since the measured value is affected by surrounding magnetic fields.

In order to correct such an error of the sensor measured value and increase the accuracy of the alignment, the marker existing in the physical space or placed in the physical space is recognized at the image recognition unit 310. The position and orientation correction unit 330 determines the corrected position and orientation measurement information using the recognized marker information.

An operation of the image recognition unit 310 will be described where a region of a particular color (assumed to be red) placed in known coordinates is used as the marker.

The image recognition unit 310 calculates a characteristic amount $I_s$ using the following formula representing the ratio of red color of pixel color in the image picked up by the image pickup unit 10:

$$R/\{(G+B)/2\} \qquad \text{(formula 1)}$$

If the characteristic amount $I_s$ exceeds a predetermined threshold, it is determined that the pixel in question is within the marker region. This is applied to all pixels in the picked-up image and detected characteristic regions are labeled respectively. Considering the center of gravity position of the labeled region as a two-dimensional position of the marker, the marker position $(x_j, y_j)$ in the observed-image coordinate system is calculated. However, if there is a red color object other than a marker in the picked-up image or if camera noise occurs, it may be accidentally determined to be a marker. Therefore, the calculated marker position $(x_j, y_j)$ is considered as a candidate marker position and the determination of the marker is performed at the position and orientation correction unit 330.

Figure 4:
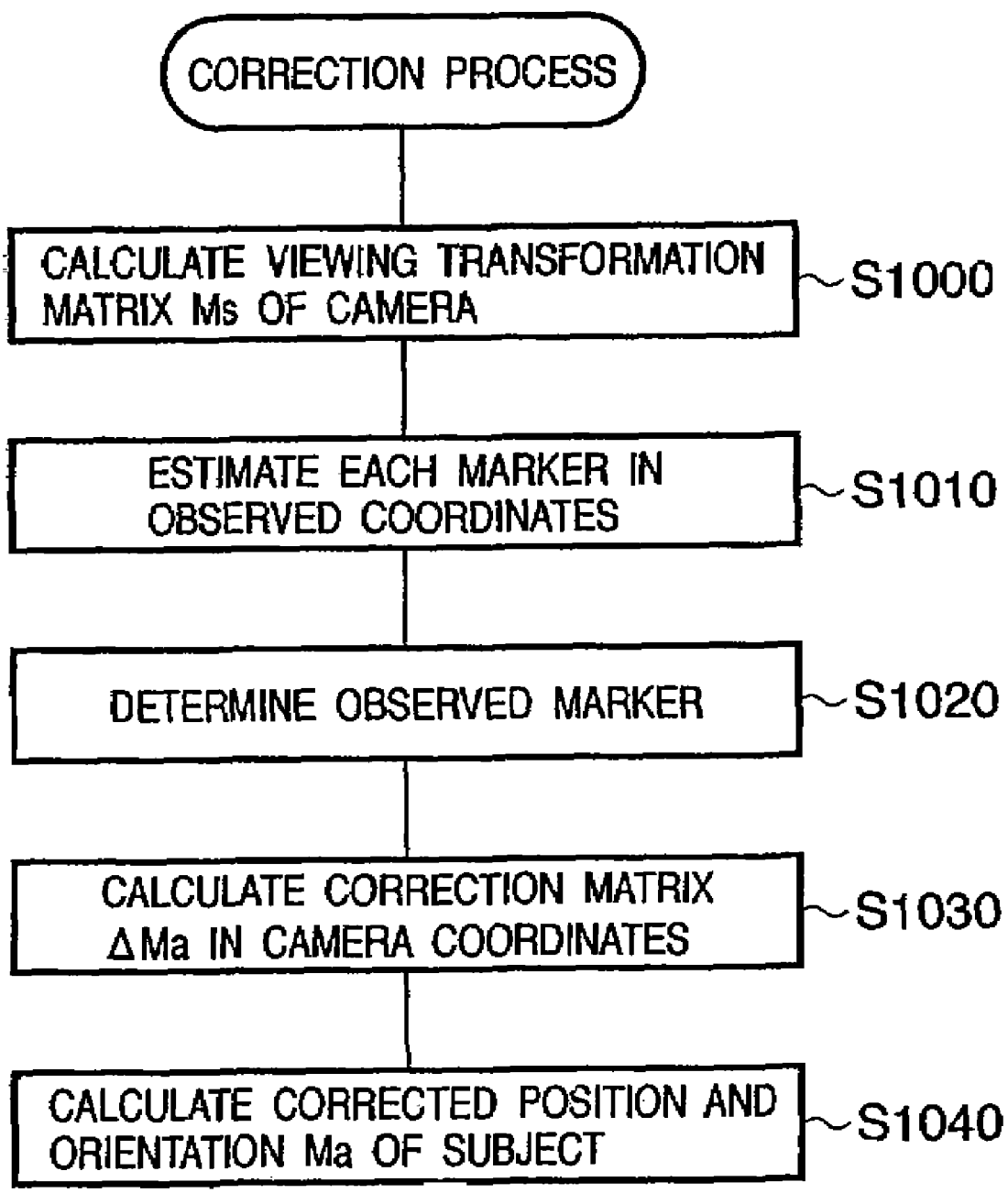
FIG. 4 is a flow chart describing a process of the position and orientation correction unit 330 in FIG. 3.

FIG. 4 is a flow chart describing a process of the position and orientation correction unit 330 in FIG. 3.

First, at step S1000, the position and the orientation of the image pickup unit 10 is acquired from the position and orientation measurement unit 320 and a camera's viewing transformation matrix $M_s$ is determined from relative relation with the origin point on the standard coordinate system. Next, at step S1010, the two-dimensional position $(x_i', y_i')$ of each marker in observed coordinates is determined. This calculation uses the three-dimensional position of each marker on the standard coordinate system obtained by the image recognition unit 310, an identical perspective transformation matrix of a known camera and the viewing transformation matrix Ms determined at step S1000. This two-dimensional position $(x_i',$ $y_i')$ is a predicted value obtained from transforming the three-dimensional position of each marker determined from the position and the orientation of an indication unit which is the output of the sensing unit 20 into the observed image coordinate system.

Next, at step S1020, the distance on a two-dimensional plane between the candidate marker position $(x_j, y_j)$ detected at the image recognition unit 310 and the predicted value $(x_i', y_j')$ in the observed image coordinate system from the sensing unit 20 is calculated. It is determined that the candidate marker position nearest to each predicted value is the two-dimensional marker position corresponding to the predicted value, and it is set as the two-dimensional position $(x_j, y_j)$ of the marker obtained from the marker detection.

At step S1030, a correction matrix ΔMa for eliminating the misalignment of the predicted value and the detected value is calculated. This ΔMa is a correction matrix for correcting the output value from the sensing unit 20 in three-dimensional space so that each predicted marker position $(x_i', y_i')$ matches each marker position on the picked-up image.

For example, this correction matrix ΔMa is calculated as follows. First, a marker 1 on the picked-up plane is identified and is assumed to be p1, and let p1' be the position of a marker 1' on the picked-up plane calculated from the output value of the sensing unit 20. Let v1 and v1' be a vector starting at the origin C of the observed coordinate system and ending at p1 and p1', respectively. The transformation in the observed coordinate system that is a three-dimensional space such that p1' and p1 overlap on the two-dimensional picked-up image is performed as follows. First, v1 and v1' are respectively transformed to unit vectors. Setting rotation axis as the vector $u_\lambda(u_x, u_y, u_z)$ determined by the outer product of the two unit vectors, the output of the sensing unit 20 is rotated and corrected by $\theta_1$ between the two vectors, determined by the inner product of v1 and v1'. That is, this rotation transformation will be the correction matrix ΔMa. The correction matrix ΔMa is represented as formula 2 below:

[Formula 1]

Finally, at step S1040, the correction matrix ΔMa determined at step S1030 is multiplied by the camera's viewing transformation matrix Ms determined at step S1000 to determine the corrected position and orientation Ma (position and orientation information 108) on the standard coordinate system. The relation is expressed as:

$$Ma = \Delta Ma \cdot Ms \qquad \text{(Formula 3)}$$

If the marker 1 can not be detected on the picked-up image, the correction process ends and the position and orientation obtained from the output of the sensing unit 20 is the final position and orientation information 108. By drawing a virtual object using the position and orientation Ma, the virtual object can be displayed at the intended position and the position and orientation of the subject (in this case, HMD) can be more precisely determined than where only the measurement of the sensing unit 20 is used.

In the foregoing description, the output of the sensing unit 20 (in the present embodiment, the magnetic sensor) is corrected by detecting a marker. However, if the marker can always be seen, such an approach using both the sensor and the marker (hybrid approach) does not have to be used. That is, the position and the orientation of a subject may be determined based on only the marker, or if the output accuracy of the sensor is sufficiently high, the output of the sensor may be used directly as the position and the orientation of the subject without the correction process using the marker.

As described above, the position and orientation information 108, together with the image information 105 and the mask information 107, is retained in the shared memory 60 as an example of the means for communicating the mixed reality information to the application.

Figure 5:
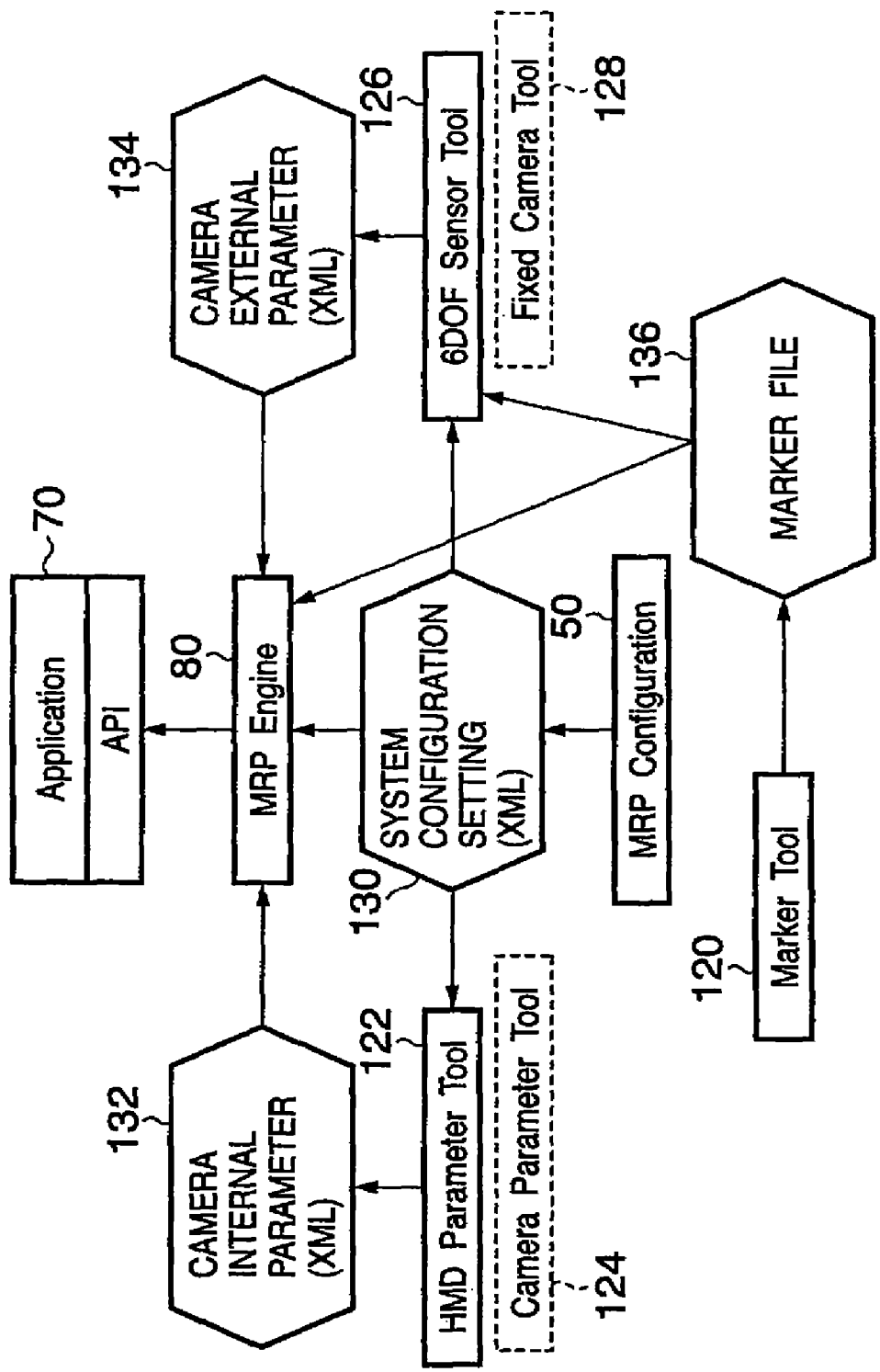
FIG. 5 shows software modules for providing the configuration shown in FIG. 1 and correlation thereof.

FIG. 5 shows software modules for providing the configuration shown in FIG. 1 and the correlation thereof.

In the figure, portions except for the application 70 are a software module group and setting files for providing the mixed reality information generation device. As shown in FIG. 5, the application 70 communicates with mixed reality information generation device via an API (Application Programming Interface) provided by the mixed reality information generation unit (MRP Engine) 80.

The software module group and the setting files for providing the mixed reality information generation device include setting unit (MRP Configuration) 50 and setting files (a system configuration file 130, a camera internal parameter file 132, a camera external parameter file 134, a marker file 136). Tools for calibrating the camera and the sensor (HMD Parameter Tool 122, Camera Parameter Tool 124, 6 degrees of freedom sensor tool (6DOF Sensor Tool) 126, Fixed Camera Tool 128), marker edit tools (Marker Tools) 120 and the like are also included.

Setting value for each type of parameters which is input from the setting unit 50 is stored in the system configuration file 130, and the HMD Parameter Tool, 6DOF Sensor Tool, HMD Parameter Tool reference the setting values stored in the system configuration file 130 and operate. In the marker file 136, information of the marker (absolute position (such as the center of gravity position and vertices coordinates) placed in the physical space and characteristic information (such as color and shape) to be recognized by a image processing are set by the marker edit tool 120. This marker information is used to identify the marker at the position and orientation information calculation unit 40 in the MRP Engine 80, or more particularly at the image recognition unit 310.

The camera internal parameters (such as focal length, lens distortion coefficient, center of the image, aspect ratio of the image) 132 and the camera external parameters (rotation matrix and translation vector determining the position and the direction of the camera in the space) 134 are respectively registered and edited by the HMD Parameter Tool 122 and the 6 degrees of freedom sensor tool 126. These camera parameters are used to calculate each type of matrix (the position and orientation) described above for the MRP Engine 80, or the like.

Figure 6:
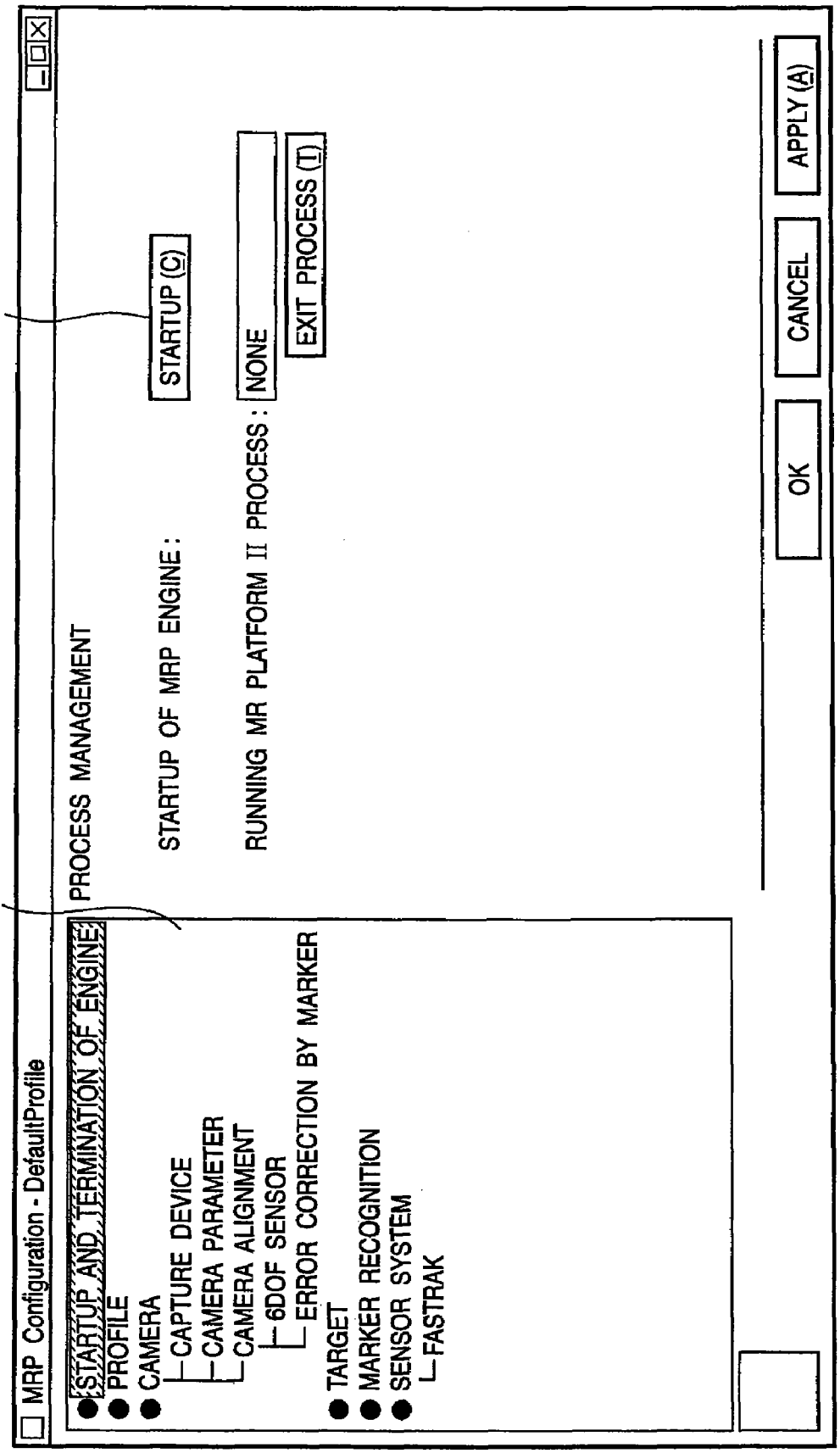
FIG. 6 is an example of a graphical user interface (GUI) presented by a setting unit 50.

FIG. 6 is an example of a graphical user interface (GUI) presented by the setting unit 50 for setting the parameters.

From this GUI, the MRP Engine 80 can be invoked, or other modules (such as reference numerals 120, 122, 124, 126, 128 in FIG. 5) can be invoked. Particularly, the invocation can be indicated by selecting at a left window 605 a process (module) desired to be invoked and clicking an invocation button 610 with a mouse.

Since multiple processes may not be able to access the image pickup unit 10 or the sensing unit 20 simultaneously depending on their configuration, exclusion control of accesses to the image pickup unit 10 or the sensing unit 20 is made. In addition, the setting unit 50 can perform the following:

saving various settings for operating the MRP Engine 80 in the form of profile for each environment, setting and management of a device used in capturing an image from the image pickup unit 10, measurement, setting and management of internal and external parameters for a camera used by the image pickup unit 10, selection of an algorithm for calculating the position and the orientation of the subject (in this case, the camera embedded in the HMD), and input and management of required parameters, setting and management if there is a subject other than the camera, setting and management of a detection algorithm and parameters used in detecting a marker, and selection, setting and management of the type of a sensor used in the sensing unit.

Although any method and format can be used for description of the setting file, a general-purpose XML format is used here.

In conventional MR platforms, entire setting and data which is output from each module (having interdependency) have been managed by a user. For this reason, human error such as wrong corresponding files has often caused systems to operate wrong. In the mixed reality information generation device according to the present embodiment, with respect to dependency with other parameters and possible combinations with other parameters, parameter information is previously stored in, for example, the setting file 130. Based on the parameter information, the setting unit 50 determines options of parameters that user can set. By displaying only user interface for setting the determined parameters, efficiency of the entire setting process can be increased and human error such as a combination of wrong setting data can be reduced.

In the present embodiment, without limitation, the parameter information includes at least one of the following:

the combination of the type of a sensor and a alignment method, the type of a setting parameter depending on the type of the sensor the type of a setting parameter depending on the number of cameras that an image pickup means has.

Figure 7:
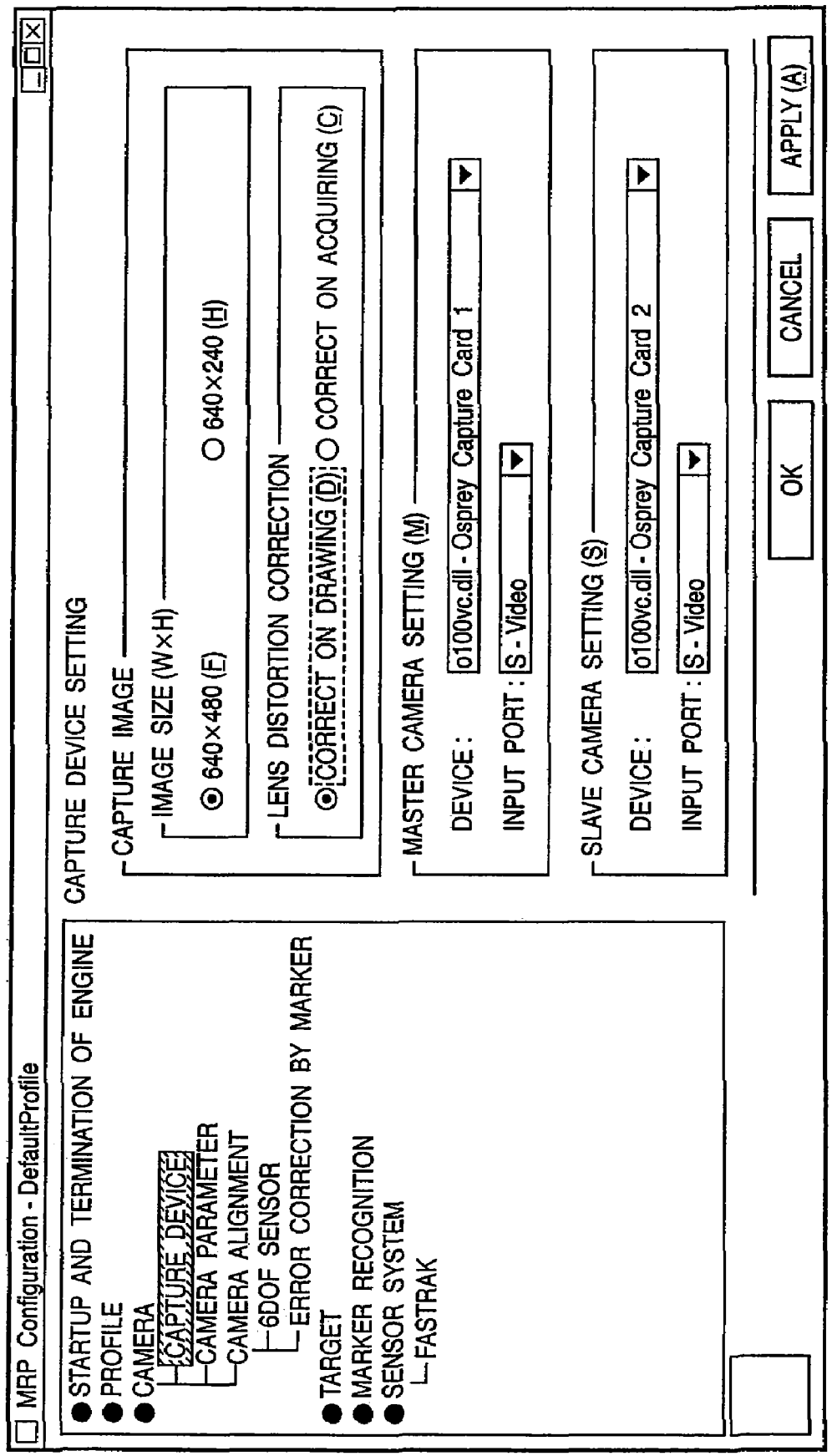
FIG. 7 shows an example of a setting screen for a capture device to capture an image of an image pickup unit 10.

FIG. 7 shows an example of a setting screen for a capture device to capture an image of the image pickup unit 10 and corresponds to the state in which "capture device" is selected in the window 605 in FIG. 6.

From this setting screen, input port setting and device selection, specifying capture image size and timing of lens distortion correction process, and the like can be made. For lens distortion setting, it can be specified whether image information 105 passed to the application 70 (i.e., written into the shared memory 60 in FIG. 1) is corrected or correction is made on drawing. If distortion correction is made, the application 70 can freely process the image information. If not, since the application 70 corrects distortion and directly writes into a flame buffer used in drawing, it becomes difficult for the application 70 to freely process the image information 105.

FIG. 8 shows an example of a setting screen for the camera parameters and corresponds to the state in which "camera parameters" is selected in the window 605 in FIG. 6.

Here, the setting of the internal camera parameters of a pair of left and right cameras provided at the positions near user's view, and the setting of the relative position relationship of the left and right cameras can be made. To start the settings, a measurement button 410 is pushed and the tool for measuring the camera parameters (the Camera Parameter Tool 124 or the HMD Parameter Tool 122 in FIG. 5) is started. At this time, the setting unit 50 acquires the information of the camera the image pickup unit 10 has (whether the number of cameras is one or stereo pair) from, for example, the system configuration file 130 and starts an appropriate tool. In this case, since the cameras are stereo camera, a tool for stereo camera (HMD Parameter Tool) 122 is automatically invoked. If the number of camera is one, the Camera Parameter Tool 124 is invoked.

In this way, an appropriate tool is invoked via the setting unit 50 depending on the state of the system, while the measured data is automatically reflected to the system configuration file 130. Therefore, user's human error associated with management of tools and setting files can be reduced. If the camera is exactly the same as the previously used camera or the data exists which is measured under the same condition, the data also can be used. Functions such as saving the measured data with its name, calling up and reusing previously saved data, organizing saved data are also provided through a known GUI for file saving and reading. By presetting a typical data to the configuration file 130 as initialization, the application 70 can be executed without measurement. This can advantageously reduce the read time of setup when the system is used for the first time.

Figure 9:
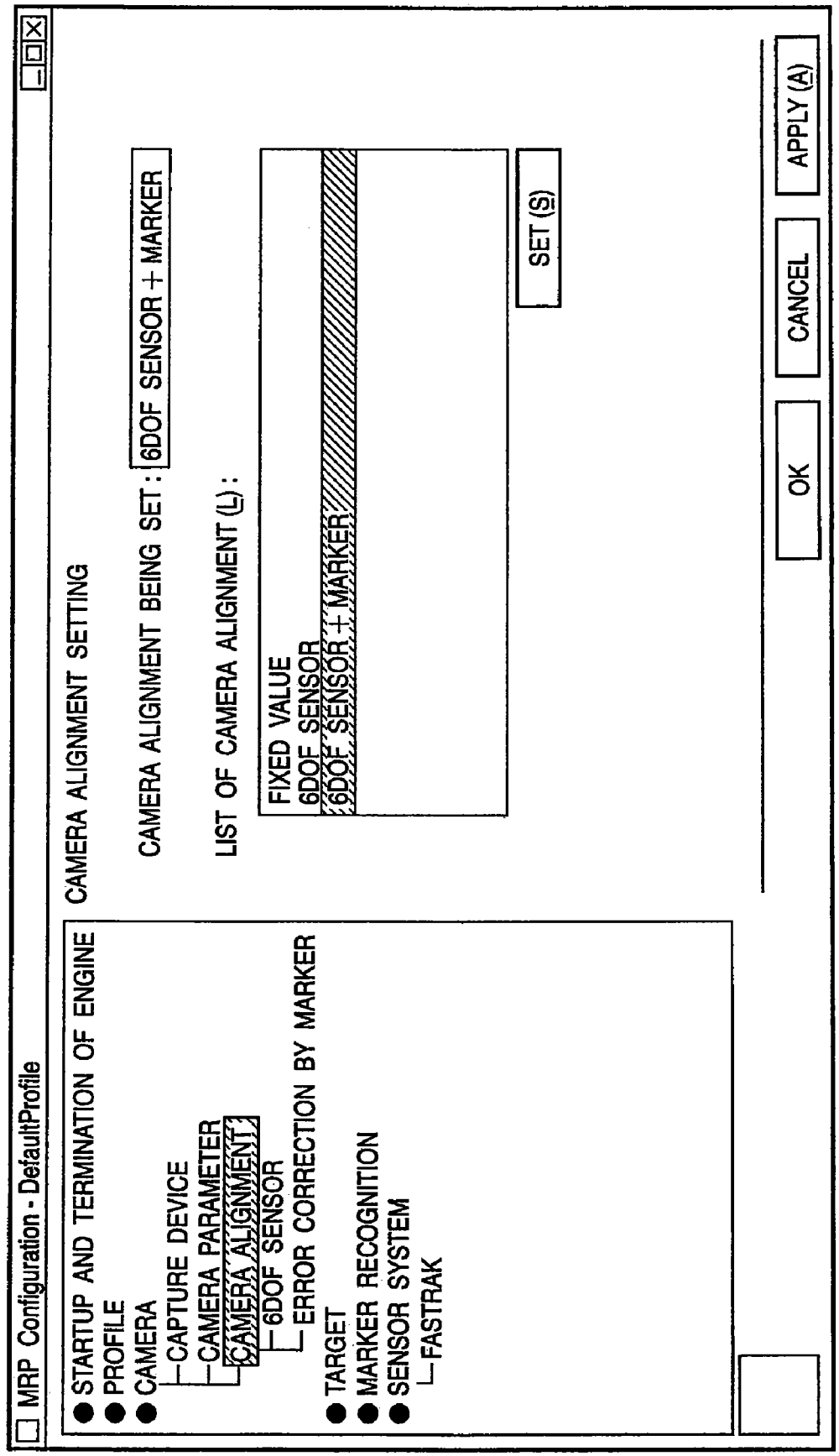
FIG. 9 shows an example of a setting screen for a camera alignment method.

FIG. 9 shows an example of a setting screen for a camera alignment method and corresponds to the state in which "camera alignment" is selected in the window 605 in FIG. 6.

Here, the state of the sensing unit 20 connected to the MRP Engine 80 is detected and the list of alignment methods is displayed which are operable in combination with a sensor used by the sensing unit 20 or solely. The displayed content is associated with the type of the sensor and registered in advance on the system configuration file 130.

By having a user select the alignment method from the displayed candidates, the range in which the user can participate can be limited, and it can be prevented to select a wrong alignment method. Although the system is configured to automatically determine the type of a connected sensor and the like, a user may also identify sensors to input the type of the sensor. If there is a desired alignment method instead of the type of a sensor, the system may be configured to select the desired alignment method from a list of alignment methods by setting to an alignment method priority mode. Once the alignment method is selected, depending on the alignment method a sensor or its candidates to be connected to the system and a screen for prompting connection to the system and its setting are displayed. Information of the type of the alignment method, the type of the corresponding sensor and the like can also be registered in advance. According to the information, a user can easily provide the desired system configuration, setting and the like.

Figure 10:
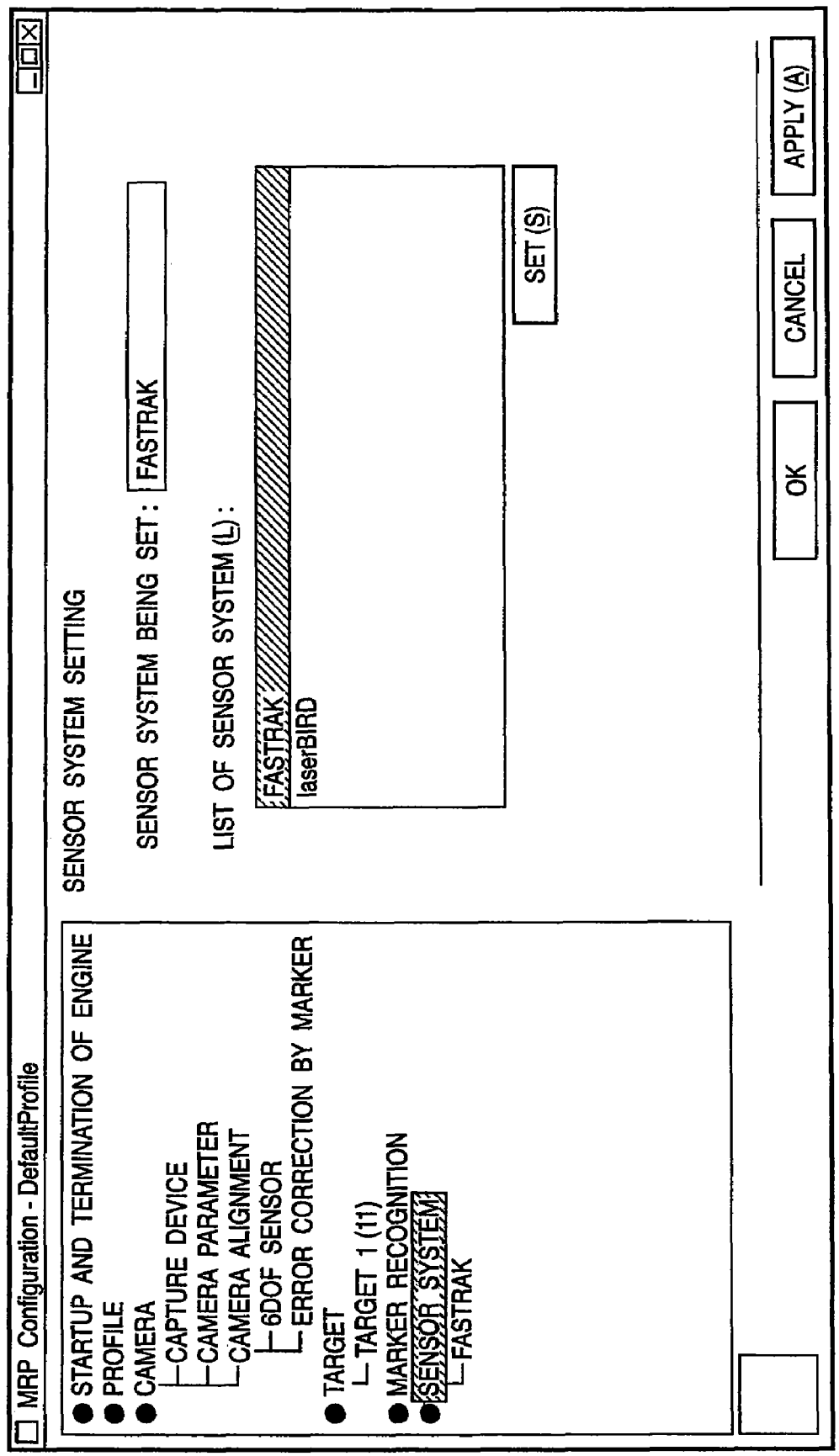
FIG. 10 shows an example of a setting screen in an alignment priority mode.

FIG. 10 shows, as an example of the case of alignment method priority mode, an example in which the method of using the 6 degrees of freedom sensor and the marker as the alignment method is selected. In this case, by selecting "sensor system" in the window 605, candidates for the sensor corresponding to the specified alignment method are displayed. Specifying the sensor from the screen determines the sensor to be used.

FIG. 11 shows an example of the setting screen displayed when a magnetic sensor is selected in FIG. 10. Various setting for the magnetic sensor can be made in the screen. Particularly in the case of a magnetic sensor illustrated in the figure (3SPCACE FASTRAK from Polhemus), while it is required to set the range of measurement (hemisphere), a check box 420 is provided for indicating the same setting for all in order to reduce effort of input. A connection check for a pen type sensor known as a stylus can also be made.

Figure 12:
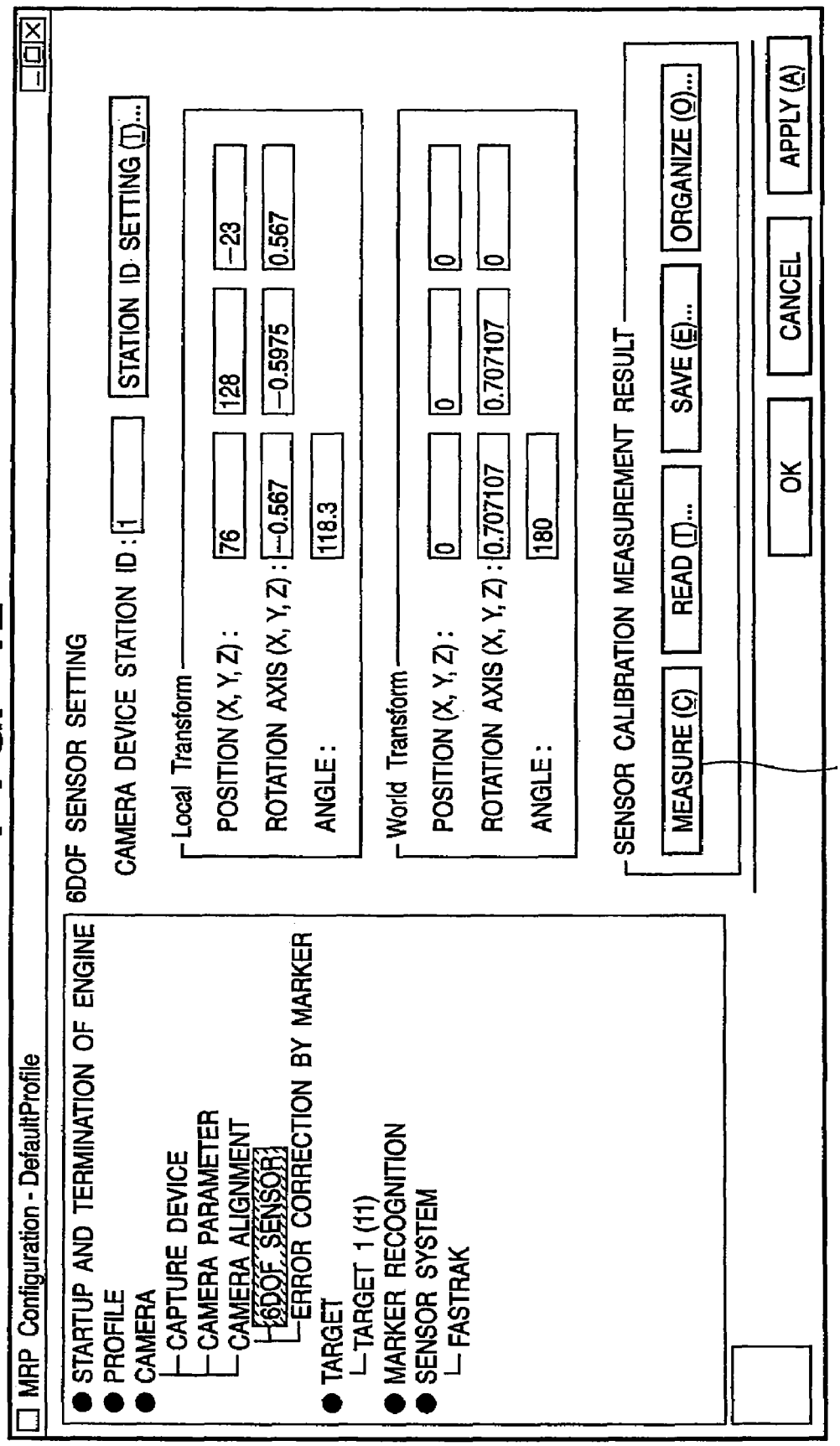
FIG. 12 shows an example of a setting screen for an initial calibration data of 6 degrees of freedom sensor.

Corresponding to selecting the combination of the 6 degrees of freedom sensor and the marker as the alignment method from the setting screen in FIG. 9, "6 degrees of freedom sensor" and "error correction by marker" are displayed as setting items within "camera alignment" in the window 605. FIG. 12 shows an example of a setting screen for an initial calibration data displayed on selecting the item of "6 degrees of freedom sensor" from these items. Also, it is assumed that a magnetic sensor is used as the 6 degrees of freedom sensor.

In the setting screen in FIG. 9, a setting screen for a transformation matrix between the camera coordinate system and the magnetic sensor coordinate system (Local Transform) and a transformation matrix between the magnetic sensor coordinate system and the standard coordinate system (World Transform) is displayed.

Values of these matrices are values measured by a measurement tool invoked when a measurement button 430 is clicked by a mouse. As is the case with other setting values, a default value is set in advance. Also, a measured value can be saved to reuse it later, and an edit such as delete or rename can be made.

FIG. 13 shows an example of a setting screen for a marker used in alignment displayed on selecting the item of "error correction by marker". A setting regarding how the information obtained from the marker is used for correcting a sensor output value can be made in this setting screen.

Figure 14:
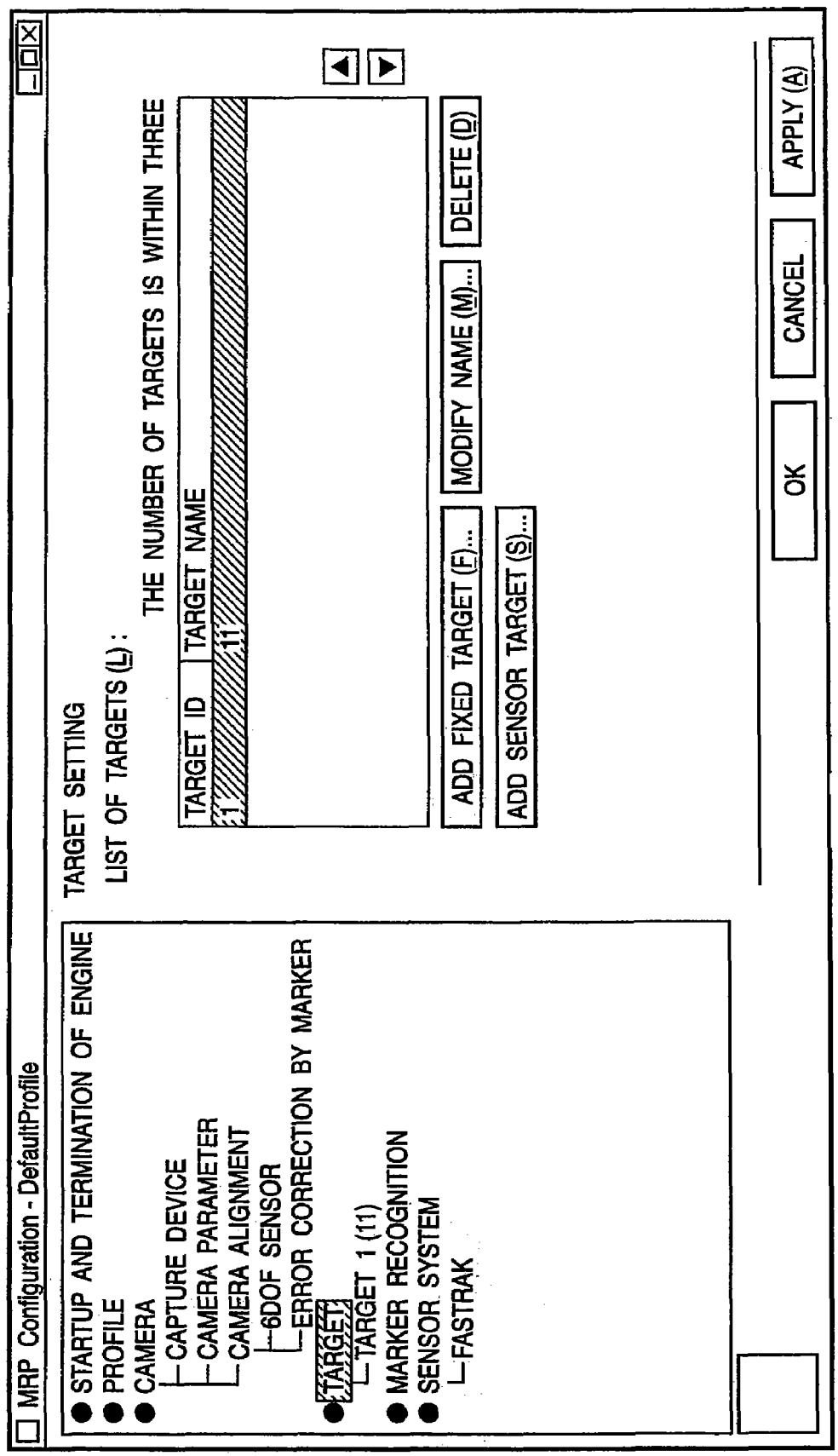

FIG. 14 shows a screen for setting a subject except for the HMD (embedded camera) for which the position and the orientation always needs to be kept track of. For example, it is conceivable that the subject is a fixed camera having a third party's point of view (using a fixed camera allows to pick up an image of an appearance of a observer wearing the HMD) or a movable object in the case of superimposing a CG on the movable object. From this screen, addition and removal of the subject as well as detail setting of the subject can be made.

Figure 15:
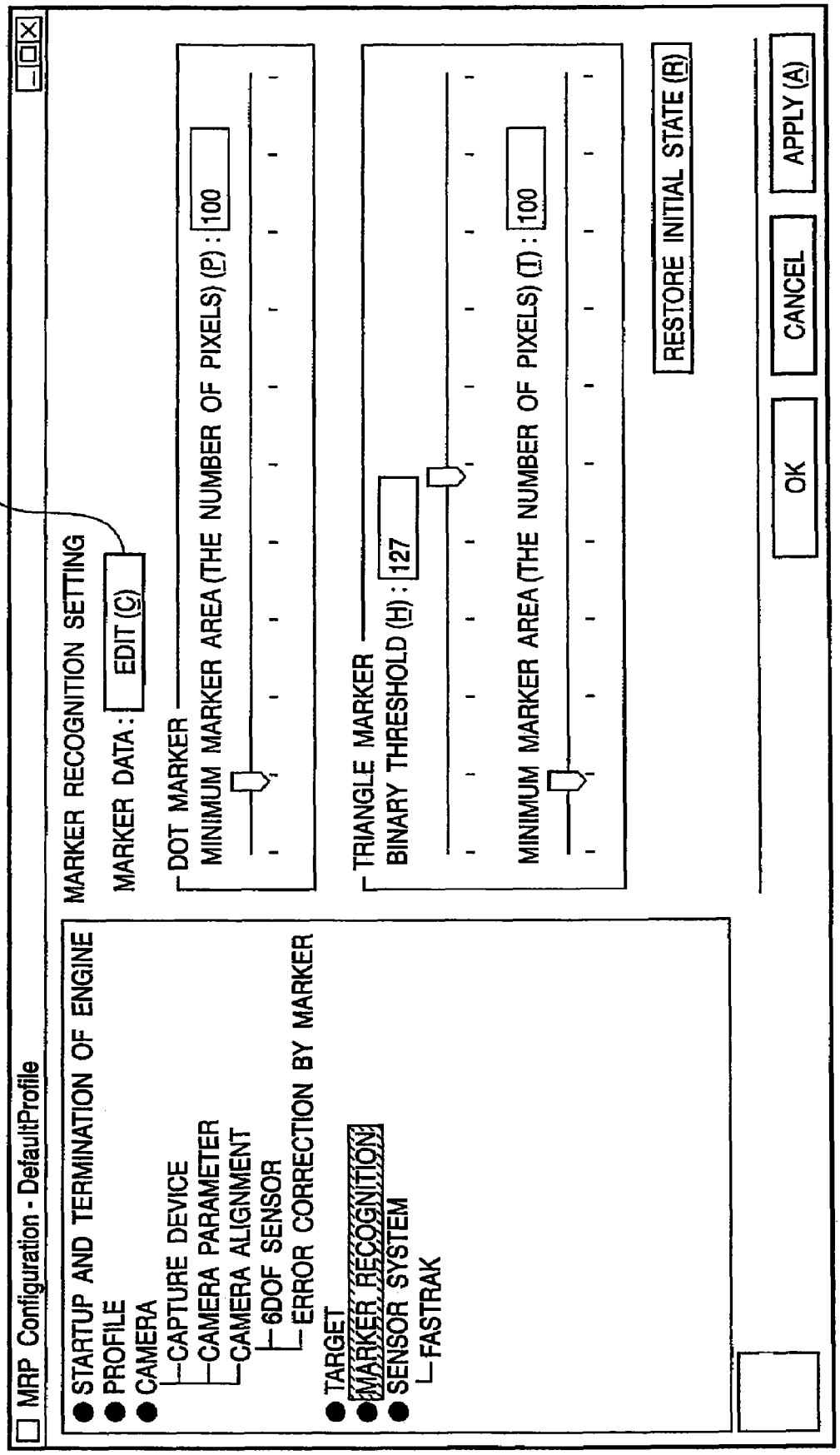
FIG. 15 shows an example of a marker recognition condition setting screen for making a setting used when an image recognition unit 310 recognizes a marker from image information 105.

FIG. 15 shows an example of a marker recognition condition setting screen for making a setting used when the image recognition unit 310 recognizes a marker from the image information 105.

In this screen, a threshold (minimum area) regarding whether a characteristic region included in a picked-up image is recognized as a marker, a binary threshold for recognizing a predetermined shaped marker (in this case, a triangle) and an area required to be finally recognized as the marker can be set. The setting for the color and the shape of the marker can be edited by a marker tool invoked from the edit button 440.

Figure 16:
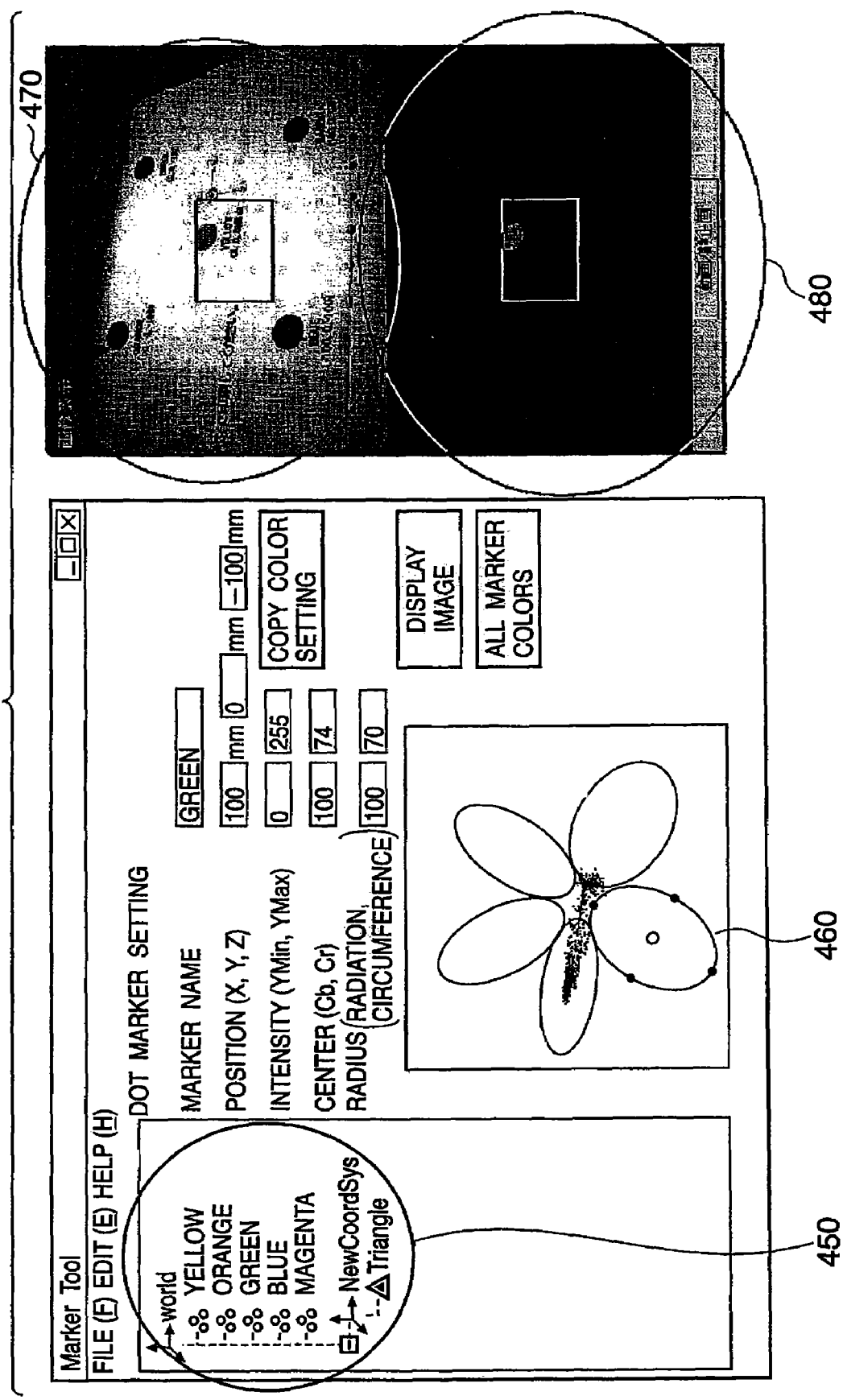
FIG. 16 is an example of a screen for a marker tool.

FIG. 16 is an example of a screen for the marker tool. A reference numeral 450 in the figure denotes a tree view of markers being set and whether the marker is a dot (small circle) marker or a triangle marker can be distinguished by an icon displayed on left side of a name. Although the dot markers are all the same icons, the icon may be an icon reflecting the color of each dot marker. Displaying the icon reflecting the color of the dot marker has an advantage of being able to intuitively recognize the type of the marker.

A reference numeral 460 denote a display region of color-difference space (for example, but not limited to, CbCr of YCbCr color model). Ellipses in the region 460 respectively indicate the color ranges of corresponding markers. Five ellipses in FIG. 16 show the situation that dot markers of five colors are set. If the number of colors used as the marker is increases, the number of the ellipses increases accordingly. The size and the position of the ellipses can be changed by a user using those user interfaces that is typically adopted in drawing applications. Therefore, the user can intuitively set and recognize the region of color recognized as the marker and the relationship with other markers.

On selecting one of the ellipses in the region 460, the marker corresponding to it is displayed in the tree 450 in a manner that is different from the other markers. On selecting a marker in the tree 450, the corresponding ellipse is displayed in a manner that is different from the other ellipse, or only the corresponding ellipse is displayed. Displaying in this manner has an effect that the relationship between a recognized range and a marker color can be intuitively presented to a user and is easy to understand.

A through view window 470 displays an image in which a marker is picked up by a camera. The recognition result window 480 displays a situation that the image recognition unit 310 extracts a marker from image information displayed in the through view window 470, according to the information set by the marker tool. A rectangular region in the through view window 470 and a rectangular region in the recognition result window 480 are the same region. Only color information within the rectangular region may be displayed in the region 460 so that color recognition range of the marker (ellipse) is set to surround it. This allows to set the color region more correctly.

Alternatively, only a recognition result of a particular marker may be displayed on the recognition result window 480. Further, when a marker picked up within the through view window 470 is displayed on the recognition result window 480, color of the marker can be modified to color having higher saturation or the like (e.g., color having the highest saturation within the corresponding ellipse) and displayed. This allows to present the recognition result to a user in an easy-to-understand way. These displays may be made with respect to a moving picture or only a scene (still) in a moving picture. By adjusting color recognition range of the marker in the state of static image, the range can be set in more detail.

Figure 17:
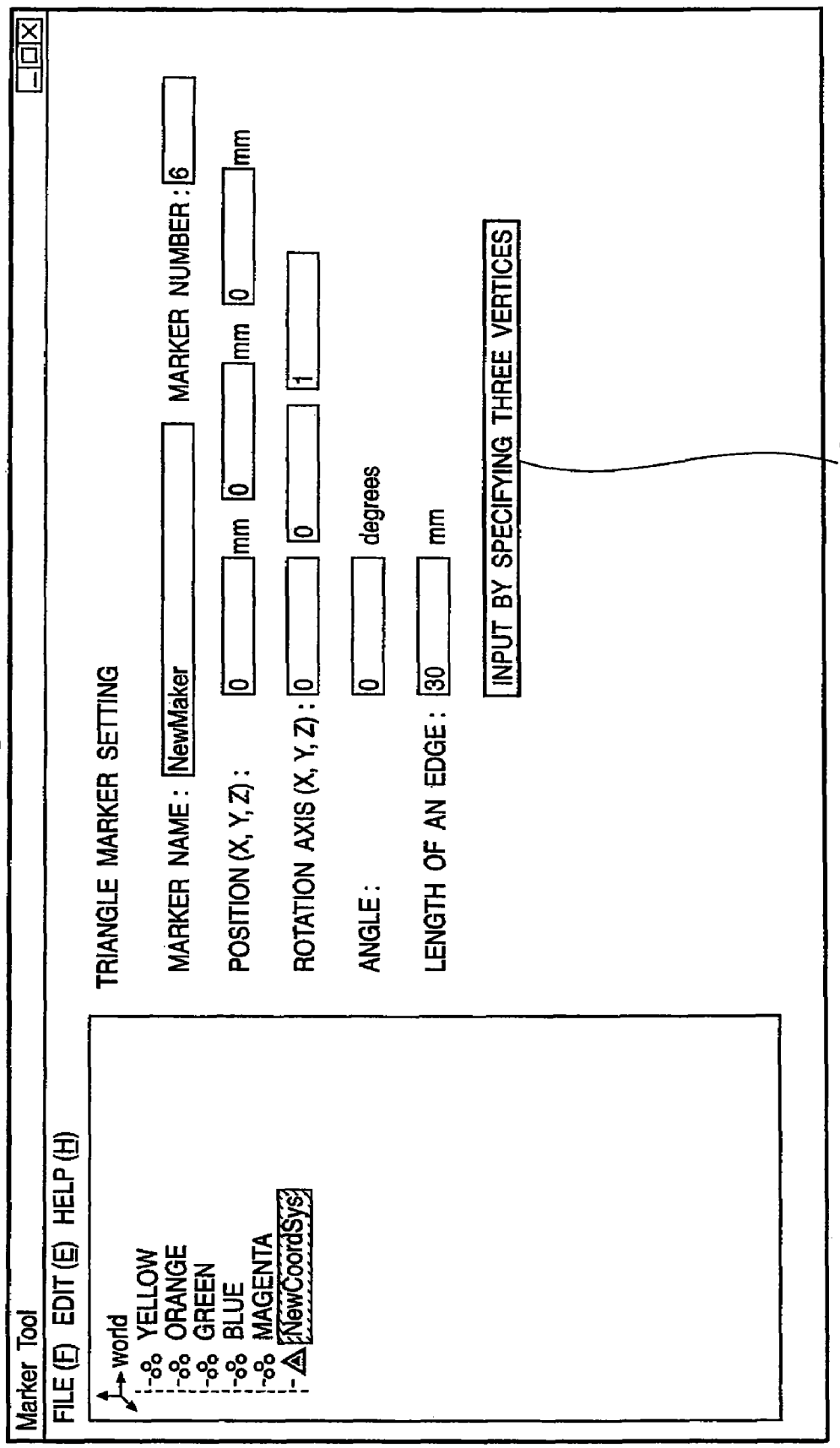
FIG. 17 shows an example of the setting screen for registering a triangle marker as a new marker.
Figure 18:
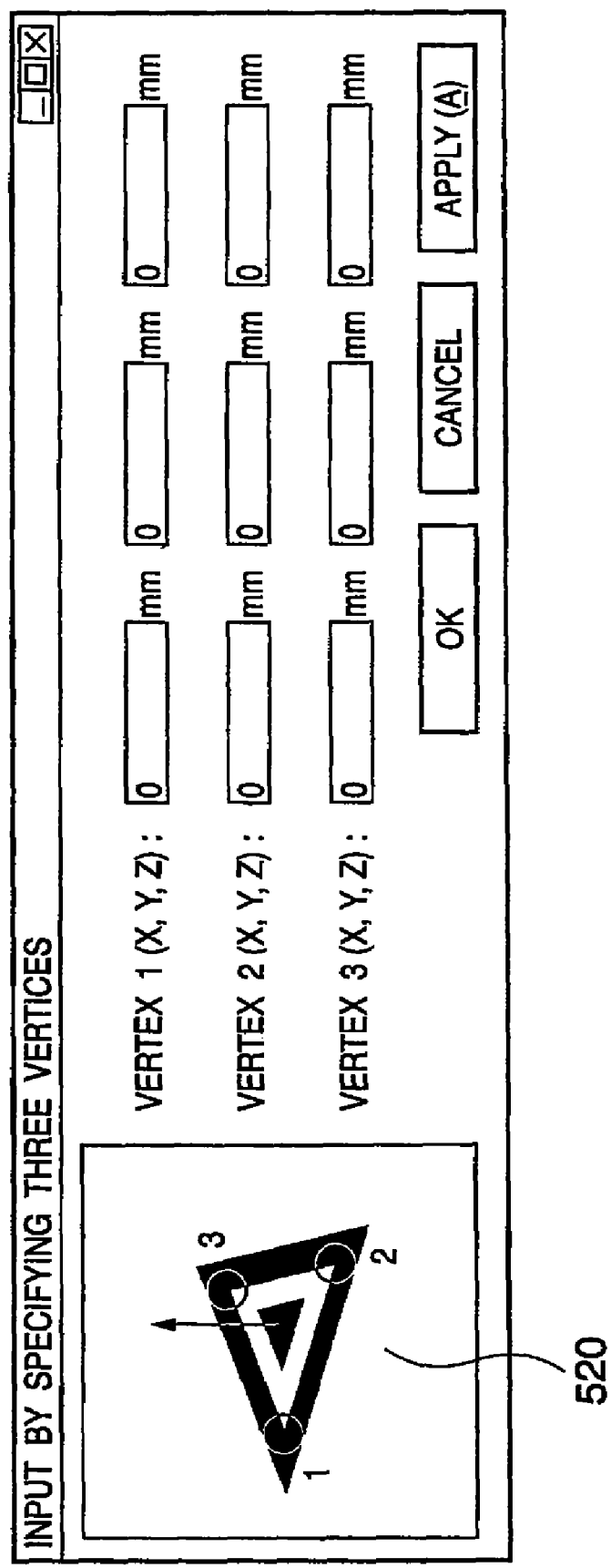
FIG. 18 shows an example of a setting screen for vertices coordinates of the triangle marker.

FIG. 17 shows an example of the setting screen for registering a triangle marker as a new marker. The position and the orientation of the marker in three-dimensional space are represented as the center of gravity position of the triangle and a rotation angle with respect to a rotation axis. The actual position and orientation of the triangle marker is input as the three-dimensional coordinates of the three vertices of the triangle. By pressing the button 510, a vertex coordinates setting screen in FIG. 18 is displayed and coordinates values of vertices are input in the screen. Since the order of inputting vertices (vertex 1, vertex 2 and vertex 3) determines the orientation of the surface, an illustration is displayed on the left side of the panel (reference numeral 520 in FIG. 18) as a guide for indicating the order of inputs. This prevents the user from confusing the order of inputting vertices, and directly inputting the coordinates of the three vertices allows to intuitively input the position and orientation of the triangle marker.

Alternatively, coordinates of any one of the three vertices may be set to constant values and two-dimensional coordinates in the plane in which the triangle marker exists may be specified. This allows to facilitate input of coordinates. In this case, using the definition in world coordinate system of the plane defined by the vertices of the triangle marker, the setting is made after transforming to three-dimensional coordinates in the world coordinate system.

As described above, according to the present embodiment, a configuration for acquiring mixed reality information required to configure a mixed reality system is separated from a configuration utilizing the mixed reality information, and the information is communicated between them using a shared memory, process-to-process communication or the like. In this configuration, if a modification occurs relating only to acquisition of the mixed reality information such as a modification of the sensor or the alignment method, only the configuration for acquiring the mixed reality information has to be changed, thus various aspects can be flexibly supported.

The setting unit for managing setting items required to acquire the mixed reality information is provided. This allows to present necessary and appropriate setting items to the user according to a hardware configuration and a setting that the user desires, and prevent the inappropriate combination of the type of sensor and the alignment method from being set.

Second Embodiment

In the first embodiment, the configuration is assumed in which a real image is passed as the image information 105 to the application 70 and the real image and CG are combined at the application side to display on the HMD. In the present embodiment, the application performs only CG generation and passes the data to the mixed reality information generation device. At the mixed reality information generation device, the real image and the CG are combined. It is apparent that the object of the present invention can be achieved in this configuration.

Figure 19:
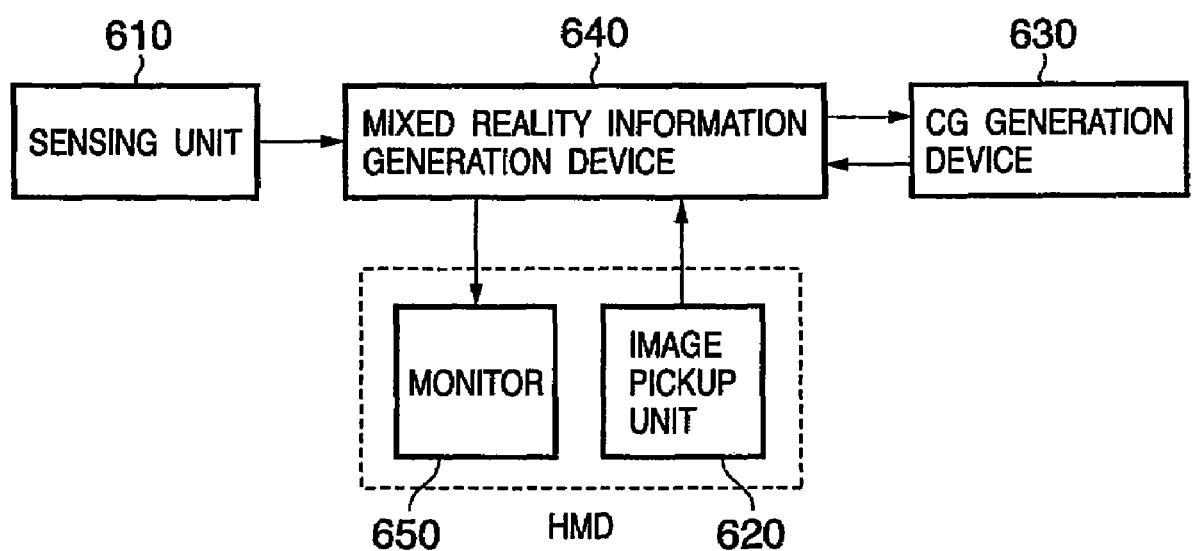
FIG. 19 shows an exemplary configuration of a mixed reality presentation system according to a second embodiment.

FIG. 19 shows an exemplary configuration of a mixed reality presentation system according to the present embodiment.

In the figure, reference numeral 610 is a sensing unit such as a magnetic or optical sensor, reference numeral 620 denotes an image pickup unit such as a camera, reference numeral 630 denotes a CG generation unit such as a personal computer or PDA in which applications operate. Reference numeral 640 denotes a mixed reality information generation device and reference numeral 650 denotes a monitor (HMD) for displaying the output of the mixed reality information generation device. The image pickup unit 620 is also embedded in the HMD in the present embodiment. In such a configuration, the sensing unit 610 measures the position and the orientation of the image pickup unit 620, and the image pickup unit 620 acquires an image in the physical space and output it to the mixed reality information generation device 640. The mixed reality information generation device 640 calculates the position and the orientation of the subject (camera) from the real image and the sensor information with high accuracy and outputs it to the CG generation device. An application stored in the CG generation device 630 generates a CG image according to the position and orientation information and outputs it to the mixed reality information generation device 640. Further, in the mixed reality information generation device 640, mask information is generated indicating a region in which the CG image is not desired to be displayed (the region in which the observer's hand is displayed and the like) within the image from the image pickup unit 620. This mask information, the image from the image pickup unit 620 and the CG image from the CG generation unit 630 are combined and output to the monitor 650.

If two pairs of the image pickup 620 and the monitor 650 are provided for right and left eyes, the images can be displayed to the observer as stereo images and a stereo HMD can be configured. Further, the number of the pair of the image pickup unit and the monitor may be three or more. Further, the data that the CG generation device 630 generates may be not only CG data but also text information.

Other Embodiment

It is apparent that the object of the present invention can also be achieved by providing a storage medium (or a recording medium) recording program code for software providing the functions of the embodiments described above to a system or a device, and reading and executing the program code stored in the storage medium by a computer (or CPU or MPU) in the system or the device.

In this case, the program code itself read from the storage medium would provide the functions of the embodiments described above, and the storage medium storing the program code would constitute the present invention. In addition to the case where the functions of the embodiments described above are provided by executing the program code read by the computer, it is apparent that the present invention also includes the case where operating system (OS) or the like running on the computer performs a part or all of actual processes based on instructions of the program code and the functions of the embodiments described above are provided by the processes.

Further, it is apparent that the present invention also includes the case where after a program code read from the storage medium is written into a memory provided in a function expansion card inserted into the computer or a function expansion unit connected to the computer, a CPU or the like provided in the function expansion card or the function expansion unit performs a part or all of actual processes based on the instruction of the program code and the functions of the embodiments described above are provided by the processes.

If the present invention is applied to the above storage medium, a program code corresponding to the flow chart described above is stored in the storage medium.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-106793 filed on Apr. 1, 2005, which is hereby incorporated by reference herein its entirety.

What is claimed is:

1. An information processing method comprising:
   an image information acquisition step of acquiring an image from an image pickup unit for picking up physical space;
   a sensor information acquisition step of acquiring a sensor output for measuring at least one of the position and the orientation of a subject in the physical space;
   a calculation step of calculating at least one of the position or the orientation of the subject using at least one of the image of the physical space and the sensor output;
   an output step of supplying the image of the physical space and the at least one of the calculated position and the orientation of the subject to an external application for generating a virtual object image to be registered with the physical space image to display a superimposed image using the at least one of the position and the orientation; and
   a presentation step of presenting a user interface causing a user to set parameters used in the calculation step, wherein the user interface includes a first user interface for setting a parameter relating to a market placed in the physical world, and the first user interface includes an input region for inputting respective three-dimensional coordinates of apexes defining the marker and a display region for displaying an image of the marker, and the display region displays the image of the marker with information indicating an input order of the three-dimensional coordinates in order to define a direction toward which a surface of the marker faces.

2. The information processing method according to claim 1, wherein said output step includes supplying the image using process-to-process communication with the external application or by writing to a shared memory with the external application.

3. The information processing method according to claim 1, wherein said calculation step includes calculating the at least one of the position and the orientation of the subject by detecting a marker included in the image of the physical space and correcting the sensor output by the coordinates information of the detected marker.

4. The information processing method according to claim 1, further comprising a mask information generation step of detecting a region having predetermined characteristics included in the image of the physical space and generating a mask information for differentiating between the region and the other region,
   wherein said output step further includes supplying the mask information to the external application.

5. The information processing method according to claim 1, wherein the parameter information includes at least one of a combination of the type of the sensor and an available alignment method, the type of a setting parameter according to the type of the sensor, and the type of a setting parameter according to the number of cameras the image pickup unit has.

6. The information processing method according to claim 1, further comprising:
   a virtual object image acquisition step of acquiring an image of the virtual object generated by the external application,
   a composite image generation step of generating a composite image of the image of the physical space and the image of the virtual object using the at least one of the position and the orientation of the subject calculated in said calculation step, and
   a display step of displaying the composite image on a display device.

7. A information processing apparatus comprising:
   an image information acquisition unit adapted to acquire an image from an image pickup unit for picking up physical space;
   a sensor information acquisition unit adapted to acquire a sensor output for measuring at least one of the position and the orientation of a subject in the physical space;
   a calculation unit adapted to calculate at least one of the position and the orientation of the subject using at least one of the image of the physical space and the sensor output;
   an output unit adapted to supply the image of the physical space and the at least one of the calculated position and the orientation of the subject to an external application for generating a virtual object image to be registered with the physical space image to display a superimposed image using the at least one of the position and the orientation; and
   a presentation unit adapted to present a user interface causing a user to set parameters used in said calculation unit, wherein said user interface includes a first user interface for setting a parameter relating to a marker placed in the physical world, and said first user interface includes an input region for inputting respective three-dimensional coordinates of apexes defining the marker and a display region for displaying an image of the marker, and said display region displays the image of the marker with information indicating an input order of the three-dimensional coordinates in order to define a direction toward which a surface of the marker faces.

8. A computer-readable recording medium storing a program for causing a computer to execute each step of the information processing method according to claim 1.

* * * * *